(12) United States Patent
Wied et al.

(10) Patent No.: US 12,373,802 B2
(45) Date of Patent: Jul. 29, 2025

(54) SYSTEMS AND METHODS FOR EXECUTING REAL-TIME ELECTRONIC TRANSACTIONS USING A ROUTING DECISION MODEL

(71) Applicant: Worldpay, LLC, Symmes Township, OH (US)

(72) Inventors: William J. Wied, Austin, TX (US);
Aman S. Cheema, Warwickshire (GB);
Manuela Dragan, Westfield, NJ (US);
Stephen E. Dinan, Austin, TX (US)

(73) Assignee: Worldpay, LLC, Symmes Township, OH (US)

( * ) Notice: Subject to any disclaimer, the term of this patent is extended or adjusted under 35 U.S.C. 154(b) by 0 days.

(21) Appl. No.: 18/060,313

(22) Filed: Nov. 30, 2022

(65) Prior Publication Data
US 2023/0107552 A1   Apr. 6, 2023

Related U.S. Application Data

(63) Continuation of application No. 17/207,792, filed on Mar. 22, 2021.

(51) Int. Cl.
*G06Q 20/02*   (2012.01)
*G06N 20/00*   (2019.01)
(Continued)

(52) U.S. Cl.
CPC ........... *G06Q 20/027* (2013.01); *G06N 20/00* (2019.01); *G06Q 20/4016* (2013.01); *H04L 45/42* (2013.01)

(58) Field of Classification Search
None
See application file for complete search history.

(56) References Cited

U.S. PATENT DOCUMENTS

| 10,002,348 B1 | 6/2018 | Doctor et al. |
| 10,268,991 B1 | 4/2019 | Davison |

(Continued)

FOREIGN PATENT DOCUMENTS

| EP | 2980739 A1 | 2/2016 | |
| WO | WO-2016084074 A1 * | 6/2016 | ......... G06Q 10/0639 |
| WO | WO-2021033184 A1 * | 2/2021 | ............... G06N 3/04 |

OTHER PUBLICATIONS

Madhavan, A., "Models and algorithms for integer multi-commodity network routing applications", Southern Methodist University, ProQuest Dissertations & Theses. (2009) (Year: 2009).*

(Continued)

*Primary Examiner* — Clay C Lee
(74) *Attorney, Agent, or Firm* — Bookoff McAndrews, PLLC

(57) ABSTRACT

Systems and methods of executing a real-time electronic transaction by a real-time transaction system are disclosed. One method includes receiving, by a routing system, an electronic transaction request from a user. The routing system may receive routing configuration data from a data query system. The routing system may determine an optimal path for executing the electronic transaction request in accordance with a routing decision model and the routing configuration data. The routing system may transmit the electronic transaction request to a transaction network via the optimal path. The routing system may generate a transaction route data based on the optimal path. The routing system may transmit the transaction route data to a transaction event-topic stream.

20 Claims, 9 Drawing Sheets

(51) Int. Cl.
*G06Q 20/40* (2012.01)
*H04L 45/42* (2022.01)

(56) References Cited

U.S. PATENT DOCUMENTS

| | | | |
|---|---|---|---|
| 2007/0162387 A1* | 7/2007 | Cataline | G06Q 20/10 705/40 |
| 2014/0105372 A1 | 4/2014 | Nowack et al. | |
| 2019/0019169 A1 | 1/2019 | Mclaughlin et al. | |
| 2019/0340583 A1 | 11/2019 | Dubinsky et al. | |
| 2019/0342203 A1* | 11/2019 | Selfin | G06N 7/01 |
| 2019/0379595 A1 | 12/2019 | Ur et al. | |
| 2020/0342539 A1 | 10/2020 | Doney | |
| 2022/0058726 A1* | 2/2022 | Miller | G06Q 20/10 |
| 2022/0101310 A1* | 3/2022 | Kumar | G06Q 20/4016 |
| 2022/0300903 A1 | 9/2022 | Huang et al. | |

OTHER PUBLICATIONS

International Search Report and Written Opinion issued on Feb. 23, 2022 in counterpart International Patent Application No. PCT/US2021/060637 (14 pages, in English).

* cited by examiner

800

```
┌─────────────────────────────────────┐
│ RECEIVING, BY A ROUTING SYSTEM, AN  │
│ ELECTRONIC TRANSACTION REQUEST      │
│ FROM A USER                         │
│ 802                                 │
└─────────────────────────────────────┘
                  ↓
┌─────────────────────────────────────┐
│ RECEIVING, BY THE ROUTING SYSTEM,   │
│ ROUTING CONFIGURATION DATA FROM A   │
│ DATA QUERY SYSTEM                   │
│ 804                                 │
└─────────────────────────────────────┘
                  ↓
┌─────────────────────────────────────┐
│ DETERMINING, BY THE ROUTING SYSTEM, │
│ AN OPTIMAL PATH FOR EXECUTING THE   │
│ ELECTRONIC TRANSACTION REQUEST IN   │
│ ACCORDANCE WITH A ROUTING DECISION  │
│ MODEL AND THE CONFIGURATION DATA    │
│ 806                                 │
└─────────────────────────────────────┘
                  ↓
┌─────────────────────────────────────┐
│ TRANSMITTING, BY THE ROUTING SYSTEM,│
│ THE ELECTRONIC TRANSACTION REQUEST  │
│ TO A TRANSACTION NETWORK VIA THE    │
│ OPTIMAL PATH                        │
│ 808                                 │
└─────────────────────────────────────┘
                  ↓
┌─────────────────────────────────────┐
│ GENERATING, BY THE ROUTING SYSTEM,  │
│ A TRANSACTION ROUTE DATA BASED      │
│ ON THE OPTIMAL PATH                 │
│ 810                                 │
└─────────────────────────────────────┘
                  ↓
┌─────────────────────────────────────┐
│ TRANSMITTING, BY THE ROUTING SYSTEM,│
│ THE TRANSACTION ROUTE DATA TO A     │
│ TRANSACTION EVENT-TOPIC STREAM      │
│ 812                                 │
└─────────────────────────────────────┘
```

*FIG. 8*

SYSTEMS AND METHODS FOR EXECUTING REAL-TIME ELECTRONIC TRANSACTIONS USING A ROUTING DECISION MODEL

CROSS REFERENCE TO RELATED APPLICATION(S)

This application is a continuation of U.S. patent application Ser. No. 17/207,792, filed Mar. 22, 2021, which is incorporated herein in its entirety by this reference.

TECHNICAL FIELD

The present disclosure relates generally to the field of electronic transactions and, more particularly, to systems and methods for executing real-time electronic transactions across multiple networks using a single platform.

BACKGROUND

Businesses, merchants, consumers, financial entities, and/or government entities may perform electronic fund transfers, payment processing (e.g., e-commerce payments), capital management, etc. domestically and internationally over various payment networks. However, many aspects of the existing electronic payment/fund transaction technology involve some inherent deficiencies or shortcomings that may lead to poor user experience, increased time and costs, and other inconveniences when sending payments electronically across various payment networks. For example, many legacy payment processing networks involve a patchwork of processing systems, fragmented systems, security risks, and the like. The present disclosure is directed to addressing these and other drawbacks to the existing electronic transaction systems and services.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

One embodiment provides a method of executing a real-time electronic transaction by a real-time transaction system, the method comprising: receiving, by a routing system, an electronic transaction request from a user; receiving, by the routing system, routing configuration data from a data query system; determining, by the routing system, an optimal path for executing the electronic transaction request in accordance with a routing decision model and the routing configuration data; transmitting, by the routing system, the electronic transaction request to a transaction network via the optimal path; generating, by the routing system, a transaction route data based on the optimal path; and transmitting, by the routing system, the transaction route data to a transaction event-topic stream.

One embodiment provides a real-time transaction system comprising: one or more computer readable media storing instructions for executing a real-time electronic transaction; and one or more processors configured to execute the instructions to perform operations comprising: receiving, by a routing system, an electronic transaction request from a user; receiving, by the routing system, routing configuration data from a data query system; determining, by the routing system, an optimal path for executing the electronic transaction request in accordance with a routing decision model and the routing configuration data; transmitting, by the routing system, the electronic transaction request to a transaction network via the optimal path; generating, by the routing system, a transaction route data based on the optimal path; and transmitting, by the routing system, the transaction route data to a transaction event-topic stream.

One embodiment provides a non-transitory computer-readable medium storing instructions for executing a real-time transaction, the instructions, when executed by one or more processors, causing the one or more processors to perform operations comprising: receiving, by a routing system, an electronic transaction request from a user; receiving, by the routing system, routing configuration data from a data query system; determining, by the routing system, an optimal path for executing the electronic transaction request in accordance with a routing decision model and the routing configuration data; transmitting, by the routing system, the electronic transaction request to a transaction network via the optimal path; generating, by the routing system, a transaction route data based on the optimal path; and transmitting, by the routing system, the transaction route data to a transaction event-topic stream.

BRIEF DESCRIPTION OF THE DRAWINGS

The accompanying drawings, which are incorporated in and constitute a part of this specification, illustrate several embodiments and together with the description, serve to explain the principles of the disclosure.

FIG. 8 illustrates a flowchart of yet another exemplary method of executing an electronic transaction, according to one aspect of the present disclosure.

DETAILED DESCRIPTION OF EMBODIMENTS

Figure 1:
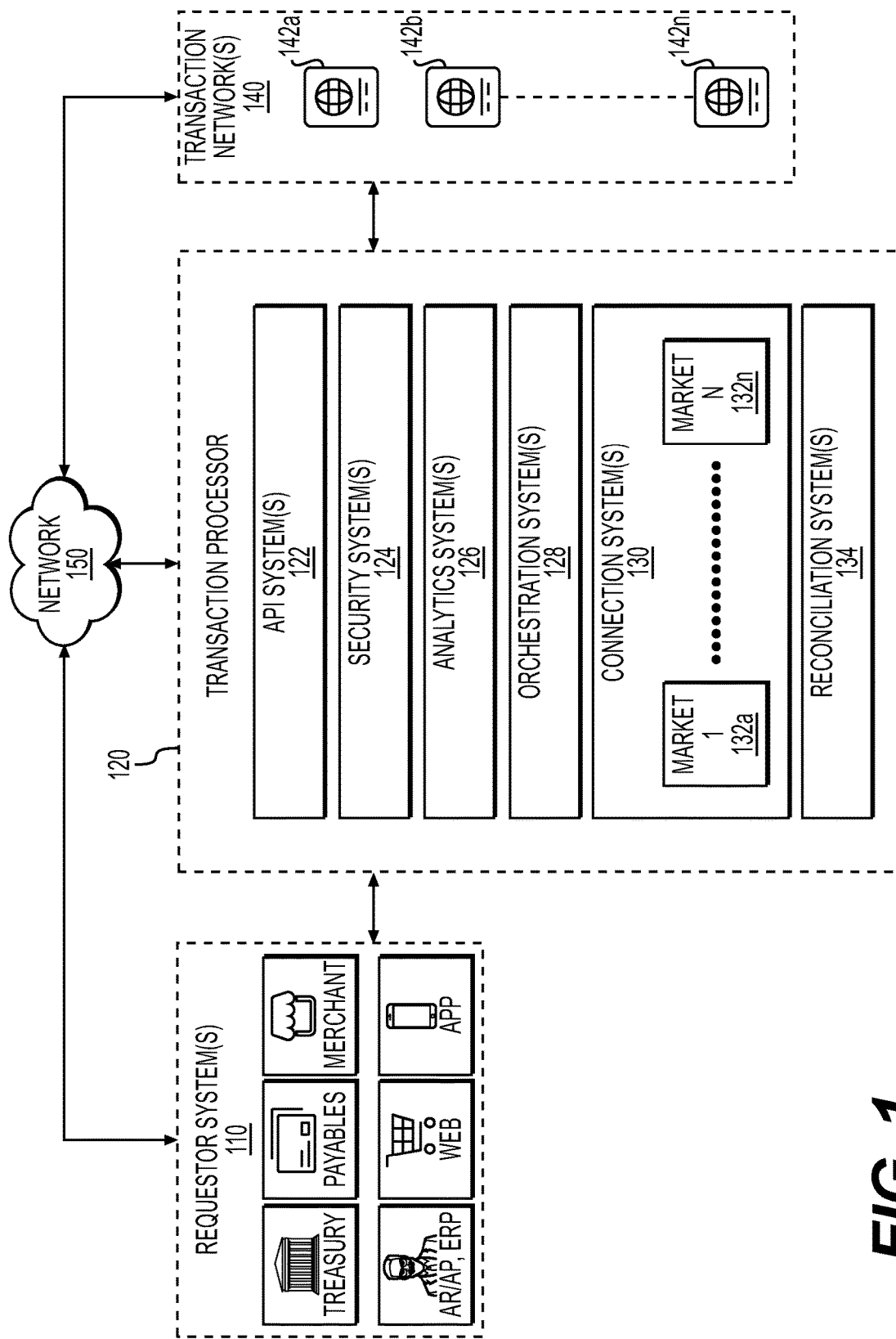
FIG. 1 depicts a block diagram of an exemplary electronic transaction system, according to one aspect of the present disclosure.

The following embodiments describe systems and methods for facilitating electronic transactions. More particularly, the embodiments contemplated in the present disclosure may enable merchants, customers, businesses, institutions, etc. to utilize a single transaction processor that may communicate with transaction requestors and transaction networks in order to facilitate various electronic transactions.

As discussed above, various aspects of the existing electronic payment technology involve certain drawbacks and deficiencies in executing payment transactions domestically and/or internationally. For example, the patchwork of complex legacy systems and evolving solutions, the maze of compliance standards across various markets and payment methods, and arbitrary transaction pricing strategies may lead to slow and unreliable transactions as well as increased costs and poor user experience.

To address the above-noted problems, the present disclosure describes systems and methods that provide a unified platform that facilitates or provides, for example: 1) a singular application programming interface (API) to all account-to-account payment methods; 2) managing consistent and globally accepted security and privacy practices; 3) intelligent payment routing and orchestration capabilities; 4) unified reconciliation and reporting across payment methods and schemes; and 5) a single management portal which may provide management of an entire customer lifecycle. For example, a transaction processor including an API system(s), a security system(s), an analytics system(s), an orchestration system(s), a connection systems(s), and a reconciliation system(s) may communicate with a requestor system(s) and transaction network(s) to facilitate and execute electronic transactions of the present disclosure.

In one embodiment, the transaction processor of the present disclosure may receive, via the API system, an electronic transaction request (e.g., an account-to-account fund transfer, purchase payment, reimbursements, etc.) from a user (e.g., a business, merchant, consumer, financial institutions, government institutions, etc.). The API system may then transmit the electronic transaction request to the choreographer system of the transaction processor. The choreographer system may then transmit a validation API call, which may be based on the electronic transaction request, to an account system of the transaction processor. The account system may then determine whether an account associated with the payment request system exists in a transaction processor database. Further, the choreographer system may transmit an authorization API call, which may be based on the electronic transaction request, to an authorization system of the transaction processor. The choreographer system may then receive an authorization response from the authorization system. Furthermore, the choreographer system may transmit an electronic transaction request at least one of a routing system, an account ledger system, an auditing system, and/or a transaction system of the transaction processor. The routing system may perform intelligent routing of the transaction request to optimize the transaction request routing based, for example, on prescriptive transaction system settings and/or user preferences or requests.

In one embodiment, the routing system of the present disclosure may receive the electronic transaction request from a user via the choreographer system. The routing system may also receive routing configuration data (e.g., prescriptive system settings, user preference, etc.) from a data query system (e.g., an entitlement query service using Structured Query Language (SQL)). The routing system may then determine an optimal path for executing the electronic transaction in accordance with a routing decision model and the routing configuration data. The routing decision model may be a rule-based engine that may solve an optimal path of electronic transactions based at least on user preferences (e.g., transaction amount, desired payment date, etc.) and business knowledge (e.g., routing criteria). The routing system may then transmit the electronic transaction request to a transaction network via the optimal path. Further, the routing system may generate a transaction route data based on the optimal path, and the transaction route data to a transaction event-topic stream (e.g., Kafka stream). In one embodiment, the transaction route data may be transmitted to the subscribers of the transaction event-topic stream for further processing.

It should be appreciated that particular consideration is made herein to payment transactions relating to businesses, merchants, and/or consumers. Despite this reference to payment transactions relating to businesses, merchants, and or consumers, certain disclosed systems and methods may apply equally well to various other e-commerce and electronic transactions. Effectively, any circumstance where credit, currency, crypto currency, collateralized funds, smart contracts, and/or tokenized funds thereto, is being transmitted over a network, systems and methods disclosed herein may be employed. Further, while the party seeking to initiate an electronic transaction and/or provide a third-party service may be referred to herein as a business, a merchant, or a consumer, a party seeking to initiate an electronic transaction need not be a business, a merchant, or a consumer, but may be a financial institution, a government institution, a service provider, a user, or any party seeking to execute an electronic transaction.

The subject matter of the present disclosure will now be described more fully hereinafter with reference to the accompanying drawings, which form a part hereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter may be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof. The following detailed description is, therefore, not intended to be taken in a limiting sense.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Referring now to the appended drawings, FIG. 1 depicts an exemplary system 100 including a requestor system(s)

110, a transaction processor 120, and a transaction network(s) 140. The requestor system(s) 110, the transaction processor 120, and the transaction network(s) 140 may be in communication with each other directly, indirectly, and/or via a network 150 (e.g., the Internet and/or one or more cloud networks). The requestor system(s) 110, the transaction processor 120, and the transaction network(s) 140 may also be in communication with each other directly via direct lines of communication, via combinations of physical, technological, and/or business relationships. The requestor system(s) 110 may include one more entities, for example, but not limited to, treasury, merchants, consumers, businesses, financial institutions, government institutions, etc. The requestor system(s) 110 may transmit, for example, a request to transmit electronic funds to one or more receivers.

In one embodiment, the requestor system(s) 110 may be configured to facilitate a business requesting to transmit electronic funds to a consumer. In this embodiment, the electronic funds may include, for example, legal settlements, insurance claims, shareholder dividends, loyalty payments, loans, investment disbursements, customer refund pay-outs, etc. In another embodiment, the requestor system(s) 110 may be configured to facilitate a business requesting to transmit electronic funds to another business. In this embodiment, the electronic funds may include, for example, accounts receivables/payables (AR/AP), rent payments, business loan payments, payroll, bank-to-bank cross border payments, supplier payments, freelancer disbursements, supply chain finance disbursements, business medical benefits disbursements, affiliate marketing programs disbursements, etc. In another embodiment, the requestor system(s) 110 may be configured to facilitate a consumer requesting to transmit electronic payments to a business (or a merchant). In this embodiment, the electronic payments may include, for example, payments at point of sale terminals, payments at eCommerce checkouts, online marketplace payments, online digital content payments, sports wagering payments, telecommunication bill payments, utilities payments, rent payments, investment payments, etc. In another embodiment, the requestor system(s) 110 may be configured to facilitate a user (e.g., any individual or consumer) requesting to transmit electronic funds to another user. In this embodiment, the electronic funds may include, for example, crowdfunding payments, mobile wallet payments, gift payments, person-to-person payments, account-to-account transfers, etc. In another embodiment, the requestors system(s) 110 may be configured to facilitate a government entity requesting to transmit electronic funds to a consumer. In this embodiment, the electronic funds may include, for example, government benefits payments, student aid payments, tuition payments, tuition reimbursement payments, etc. In another, the requestors system(s) 110 may be configured to facilitate a user or consumer requesting to transmit electronic payments to a government entity. In this embodiment, the electronic funds may include, for example, transit payments, parking payments, tax payments, permit payments, payroll payments, etc.

In one embodiment, the requestor system(s) 110 may utilize an integration portal (or platform) and/or integration services provided by the transaction processor 120 for integrating user experience and/or user interfaces (e.g., AR/AP, Enterprise Resource Planning (ERP) system, a website, an app, etc.) for interacting with the transaction processor 120. In some embodiments, the requestor system(s) 110 may be integrated with the transaction processor 120 by using integration tool kits/services and/or a do-it-yourself (DIY) model utilizing the API system(s) 122 of the transaction processor 120.

Still referring to FIG. 1, the transaction processor 120 may include an application programming interface (API) system(s) 122 (e.g., an API gateway), a security system(s) 124, an analytics system(s) 126, an orchestration system(s) 128, a connection system(s) 130, and a reconciliation system(s) 134. The connection system(s) 130 may be configured to communicate with various markets domestically and/or internationally (e.g., Markets 1-N 132a-132n). The transaction processor 120 may be configured to facilitate electronic transactions and communications between the requestor system(s) 110 and the transaction network(s) 140. For example, the API system(s) 122 may receive one or more requests to transfer funds (or payments) electronically from the requestor system(s) 110 via an API (e.g., a representational sate transfer (RESTful) real-time API or file-based batch API) of the transaction processor 120. The RESTful API (or API) may be accessed over one or more public Hypertext Transfer Protocol Secure (HTTPS) endpoints. The batch API (or API) may be accessed over one or more public Secure File Transfer Protocol (SFTP) endpoints. The API may include capabilities to create customer identities in the transaction processor 120, associate bank accounts to the customer identities, and make payments between multiple accounts. The API system(s) 122 may communicate with the security system(s) 124, analytics system(s) 126, and the orchestration system(s) 128 to execute the electronic transactions of the present disclosure. For example, the API system(s) 122 may transmit the electronic fund transfer (or payment) requests to the orchestration system(s) 128. The orchestration system(s) 128 may then transmit the electronic payment requests to appropriate networks or schemes in the transaction network(s) 140 via the connection system(s) 130. (Further described later in detail below.) Additionally, the reconciliation system(s) 134 may receive notifications, messages, and/or acknowledgements from the transaction network(s) 140, and may transmit appropriate messages, alerts, and/or signals associated with the electronic fund transfer request to the requestor system(s) 110 in real-time.

The transaction processor 120 may be a single processor utilizing a single API domestically and/or internationally across the globe. That is, the transaction processor 120 may facilitate account-to-account real-time electronic transactions (e.g., electronic payments, funds transfer, currency exchange, reimbursement, asset managements, etc.) by establishing a client centric platform that unifies, orchestrates, and executes electronic transactions domestically and/or internationally. Moreover, the transaction processor 120 may be configured to execute electronic fund transfers, currency exchange transactions, tokenization, and/or electronic transaction authorizations within the single platform. Further, the transaction processor 120 may be configured to operate consistently, in accordance with globally accepted security and privacy practices. Furthermore, the transaction processor 120 may be configured to perform intelligent payment routing via the orchestration system(s) 128 in real-time based on user (e.g., the requestor system(s) 110) preferences. In some embodiments, the user may make changes to transaction routing preferences (e.g., time and costs of completing payment transactions) in real-time. The transaction processor 120 of the present disclosure may provide, among other things, a single partner accountability, cost reduction, improved cash flow, increased payment security, improved access to payments, and better insight and accountability of payments/funds. Thus, the transaction processor 120 may be a one-stop shop for executing payments transactions.

Still referring to FIG. 1, the transaction network(s) 140 may include one or more networks or schemes 142*a*, 142*b*-142*n*. The one or more schemes (or networks) 142*a*-142*n* may include, for example, an Automated Clearing House (ACH) networks (e.g., ACH, Same Day ACH, etc.), Card networks (e.g., American Express, Discover, MasterCard, Visa, etc.), Real Time Payment (RTP) networks (e.g., the Clearing House, etc.), blockchain networks, wire transfer networks, Faster Payments network, Bankers' Automated Clearing System (Bacs) Payment Schemes, the Clearing House Automated Payment System (CHAPS) network, Single Euro Payments Area (SEPA) network, SEPA Instant Credit Transfer (SCT Inst) network, and/or other financial platform networks (e.g., Dwolla, PayPal, Western Union, Currencycloud, TransferMate, etc.). The transaction network(s) 140 may complete or reject the electronic fund transfer request upon authenticating and/or authorizing the electronic fund transfer request in accordance with the established policies and/or rules of one or more of the schemes 142*a*, 142*b*-142*n*.

Figure 2:
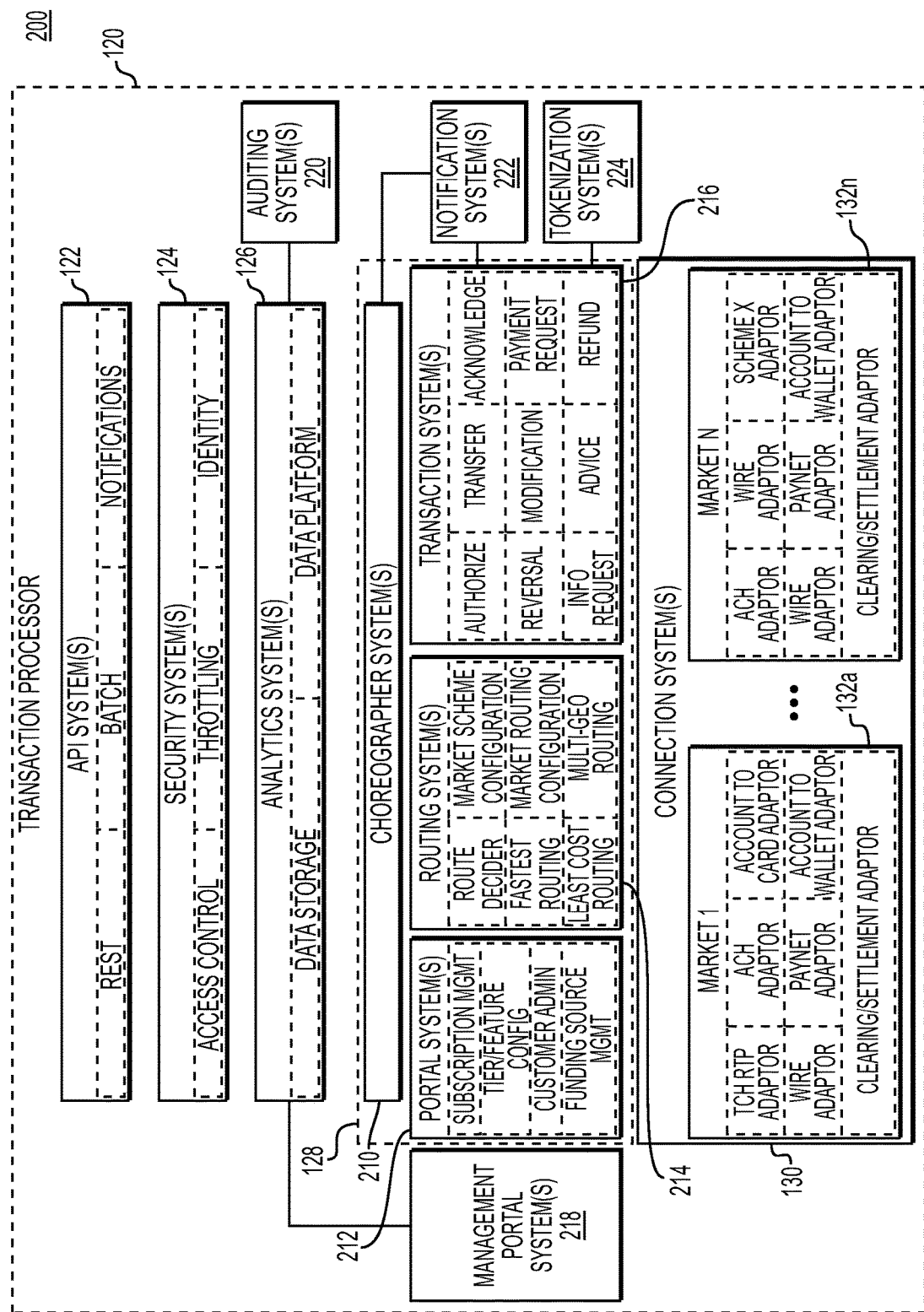
FIG. 2 depicts a block diagram of another exemplary electronic transaction system, according to one aspect of the present disclosure.

FIG. 2 depicts an exemplary system 200 including the transaction processor 120. Specifically, the portion depicted in FIG. 2 represents a more detailed example illustration of the transaction processor 120, but which should not be construed as limiting transaction processor 120. The transaction processor 120 may include one or more of the API system(s) 122, the security system(s) 124, the analytics system(s) 126, the orchestrating system(s) 128, a management portal system(s) 218, an auditing system(s) 220, a notification system(s) 222, and a tokenization system(s) 224. The API system(s) 122 may facilitate communications with the requestor system(s) 110, transaction network(s) 140, and between one or more systems (or microservices) of the transaction processor 120 depicted in FIG. 2. For example, the API system(s) 122 may utilize APIs (e.g., internal or external APIs), batch APIs, and/or notification APIs in order to facilitate the execution of the electronic transactions of the present disclosure. In one embodiment, the RESTful API of the API system(s) 122 may be accessed over one or more public Hypertext Transfer Protocol Secure (HTTPS) endpoints. The API system(s) 122 may utilize, for example, POST, GET, and PUT methods to execute and facilitate the electronic transactions of the present disclosure. In another embodiment, the batch API of the API system(s) may be accessed over one or more public Secure File Transfer Protocol (SFTP) endpoints.

Still referring to FIG. 2, the security system(s) 124 may facilitate, for example, user (or customer) access control, user throttling, and/or user identification. In one embodiment, the security system(s) 124 may ensure that the transaction processor 120 is in compliance with one or more data protection standards. One or more data elements of the transaction processor 120 may be monitored in order to meet the one or more encryption standards established by the transaction processor 120. For example, data elements, such as, personally identifiable information (PII), payment card data (PCI data), authentication credentials, other sensitive data, company confidential data, etc. may be monitored by the security system(s) 124.

In one embodiment, the security system(s) 124 may facilitate and manage the encryption of data and/or keys associated with the electronic transactions of the present disclosure. For example, the security system(s) 124 may include a key management service (KMS) that may establish a time-limit for the life of an encryption key. The KMS may be managed internally or externally (e.g., Amazon Web Service Key Management Service (AWS KMS)) from the transaction processor 120. In one embodiment, once an encryption key exceeds its lifespan, the encryption key may be deleted from an encryption key cache in the transaction processor 120. The encryption key may then be replaced with a newly generated key by the KMS. This functionality may provide compliance with a data key rotation policy that may be established by the transaction processor 120, for example, by setting a cache expiration that is within the data key rotation policy limits. Further, access to the keys in the KMS may be limited by the access control of the security system(s) 124 and may be assigned with least-privilege.

In one embodiment, the security system(s) 124 may be configured to give access to users to call operations against KMS Customer Master Key (CMK) with only the designated service and/or user identities. The security system(s) 124 may also audit the use and access of the master keys. Further, the security system(s) 124 may utilize a secure hash function (e.g., Secure Hash Algorithm-256 (SHA-256)) for data elements that are encrypted but also must be searched on. Since there may be cases where the hashed data elements (e.g., Sender name, Sender account number, Sender routing number, Receiver Name, Receiver account number, Receiver routing number, etc.) may be searched across all tenants, hashed data elements may have a global salt. In one embodiment, sensitive data elements that are at rest may be stored in the transaction processor 120 using Advanced Encryption Standard (AES)-256. Also, any message data in motion may be protected by enforcing a minimum of Transport Layer Security (TLS) 1.2.

Still referring to FIG. 2, the analytics system(s) 126 may comprise a data storage (e.g., a data lake) and a data platform for performing analytics. For example, the auditing system(s) 220 and the management portal system(s) 218 may be in communication with the analytics system(s) 126 in order to perform analysis and auditing on the electronic transactions of the present disclosure. The auditing system(s) 220 may subscribe to transaction event topics and transmit the event topics to a data lake for analytics. The management portal system(s) 218 may facilitate onboarding, configuration, and certification for the users of the transaction processor 120. The management portal system(s) 218 may provide self-service functionality for the users of the transaction processor 120 as well as administrative functionality for the internal support teams of the transaction processor 120.

Still referring to FIG. 2, the orchestration system 128 may include a choreographer system(s) 210, a portal system(s) 212, a routing system(s) 214, and transaction system(s) 216. The choreographer system(s) 210 may be configured to choreograph the steps required to process one or more real-time electronic transaction requests or one or more real-time transaction inquiries of the present disclosure. For example, the choreographer system(s) 210 may be configured to verify whether a transaction requestor (e.g., requestor system(s) 110) has permission to request transactions and/or inquiries. For example, the choreographer system(s) 210 may make an internal API call to an authorization system of the transaction processor 120.

In one embodiment, the choreographer system(s) 210 may facilitate execution of electronic funds transfer requests (or payment requests). For example, the choreographer system(s) 210 may make an internal API call to an account validation query system of the transaction processor 120 to validate whether the source account exists. The account validation query system may verify the formatting of the source and destination account. Further, the choreographer system(s) 210 may be configured to make internal API calls to an authorization system of the transaction processor 120 to verify that the user has permissions to perform payment using the specified source account. In one embodiment, the choreographer system(s) 210 may be configured to post a payment request to event-topic stream (e.g., Kafka) transactions. The choreographer system(s) 210 may be configured to respond back to an external API caller that the payment request has been accepted for processing.

In one embodiment, the choreographer system(s) 210 may be configured to process transaction inquiries in real-time. For example, the choreographer system(s) 210 may make internal API calls to the transaction query system to perform transaction lookups. Further, the choreographer system(s) 210 may make internal API calls to the authorization system to verify whether the user has permissions to view the transaction and associated accounts. Additionally, the choreographer system(s) 210 may respond back to an external API call through the API system(s) 122 with the inquiry response.

Still referring to FIG. 2, the portal system(s) 212 may be configured to facilitate, for example, subscription management of users (or customers) or developers, tier and feature configurations, customer administration, funding source managements, etc. The portal system(s) 212 may allow the developers or users of the requestor system(s) 110 to initiate transactions or payment requests, transmit transaction status, receive notifications, etc. in real-time. The portal system(s) 212 may be configured to facilitate or provide an integration portal that may include, for example, a unified developer portal (e.g., sandbox interface) that the developers may utilize in order to integrate the requestor system(s) 110 with the transaction processor 120. The integration portal may enable the developers to configure the request system(s) 110 to access, communicate with, and utilize the functionalities of the transaction processor 120. In some embodiments, the integration portal may include an interactive marketing platform of the transaction processor 120. The marketing platform may provide, for example, demonstration sections of how payments happen and what happens in the backend of the transaction processor, as well as various use cases for accessing, communicating with, and utilizing the functionalities of the transaction processor 120. Thus, the integration portal may achieve seamless integration of the requestor system(s) 110 with the transaction processor 120 via the marketing portal and the integration portal. In one embodiment, the integration portal may include live connections to the APIs of the transaction processor 120, code snippets for communicating with the transaction processor 120, and a certification interface for certifying the APIs used for communicating with the transaction processor 120. The code snippets may be provided in different languages and in real-time. For example, changing the RTP scheme to a different scheme may be achieved by editing the snippets in a live sandbox environment. Further, the integration portal may provide Uniform Resource Locator (URL) links to the developers to allow using a common API by following the provided links and integrating with the transaction processor 120 easily and intuitively without having to store any separate URLs. Furthermore, the transactions may be updated in real-time via the integration portal. For example, payment rails may be changed based on the due date, the ability to cancel payments, etc. Additionally, the integration portal may provide notifications regarding the transaction that the users can access and see without having to email or call.

Still referring to FIG. 2, the routing system(s) 214 may facilitate route deciding, fastest routing, least cost routing, market scheme configuration, market routing configuration, multi-geo routing, etc. The routing system(s) 214 may execute transaction routing by looking at both customer configuration and scheme capabilities. The data associated with price, speed, and capability across both the customer and schemes may be utilized to identify the best possible route for the electronic transactions depending upon configuration for a specific customer and whether the customer has a speed versus cost processing preference. The routing system(s) 214 may utilize an open-source business rule management system (BRMS) (e.g., Drools) to implement the routing decision models. The routing system(s) 214 may be configured to facilitate and choreograph the steps required to route and execute payment requests. The routing system(s) 214 may subscribe to transaction event topics and may act on payment initiated events to initiate routing requests. In one embodiment, the routing system(s) 214 may make internal API calls to an entitlement query system(s) to retrieve customer specific configuration details that may impact the route of the payment requests. The routing system(s) 214 may process transaction requests, including customer entitlement details, through a routing model to identify the appropriate payment scheme adapter (further described in more detail below). The routing system(s) 214 may make internal API calls to one or more payment scheme adapters, which then may call the market specific payment scheme implementation. Further, the routing system(s) 214 may publish route chosen events to a transaction event topic data stream.

Still referring to FIG. 2, the transaction system(s) 216 may be configured to facilitate, for example, electronic funds transfer requests, electronic funds transfer information request, electronic funds transfer advice, electronic funds transfer authorization, acknowledgement, reversal, modification, and refund, etc. The transaction system(s) 216 may be in communication with the notification or messaging system(s) 222. The notification system(s) 222 may receive notifications from the payment schemes (e.g., schemes 142a-142n) to provide status updates as a transaction moves thorough its lifecycle. The notifications from the payment schemes, along with the associated scheme details, may be received through the API system(s) 122. The notification system(s) 222 may respond to the notifications with acknowledgments. The notification system(s) 222 may then publish a payment notification received event to a payment notification topic. In one embodiment, the notification system(s) 222 may include a payment notification handler that subscribes to payment notification topics and await the payment notification received messages. That is, when an event is processed, the payment notification handler may first make an internal API call to a transaction query system(s) to retrieve additional details of the transaction associated with the payment notification. The payment notification handler may then publish to a payment notification topic, a payment acknowledgement message.

The connection system(s) 130 may include one or more adapters for communicating with the transaction network(s) 140. For example, the connection adapters for Market 1 132a may include a TCH RTP adapter, ACH adapter, account to card adapter, wire adapter, payment adapter, account to wallet adapter, clearing/settlement adapter, etc. Additionally or alternatively, the connection adapters for Market N 132n may similarly include, for example, ACH adapter, wire adapter, scheme adapter, wire adapter, paynet adapter, account to wallet adapter, clearing/settlement adapter, etc.

In one embodiment, the transaction system(s) 216 may receive information associated with the electronic transactions of the present disclosure and facilitate the execution of the electronic transactions. The transaction system(s) 216 may transmit the transaction information to the tokenization system(s) 224. The tokenization system(s) 224 may then generate tokens to use surrogate values for the sensitive account details used for payment transactions requested by the requestor system(s) 110. A token may be a low-value token or a high-value token. Further, a token may be a randomly generated number. In other embodiments, a token may be a pseudorandom number, encrypted information, or other character sequence.

The transaction processor 120 may be deployed to servers and data centers in multiple regions and availability zones. The transaction processor 120 may be cloud-native and cloud-agnostic utilizing containerized microservices and may be deployed to an elastic infrastructure on an open-source container-orchestration system (e.g, Kubernetes). In one embodiment, the transaction processor 120 may be deployed and built completely in cloud. Thus, the complexity of the transaction processor 120 may be contained by building ground-up with cloud-based microservices design (e.g., AWS Cloud infrastructure). The cloud-based microservices design of the present disclosure may allow quick enhancements and elastically scaling the transaction processor 120 without customer impact or downtime. For example, small teams of developers may quickly add enhancements and new scheme supports. Also, failures may be contained and may prevent collateral damage to other functionality.

Figure 3:
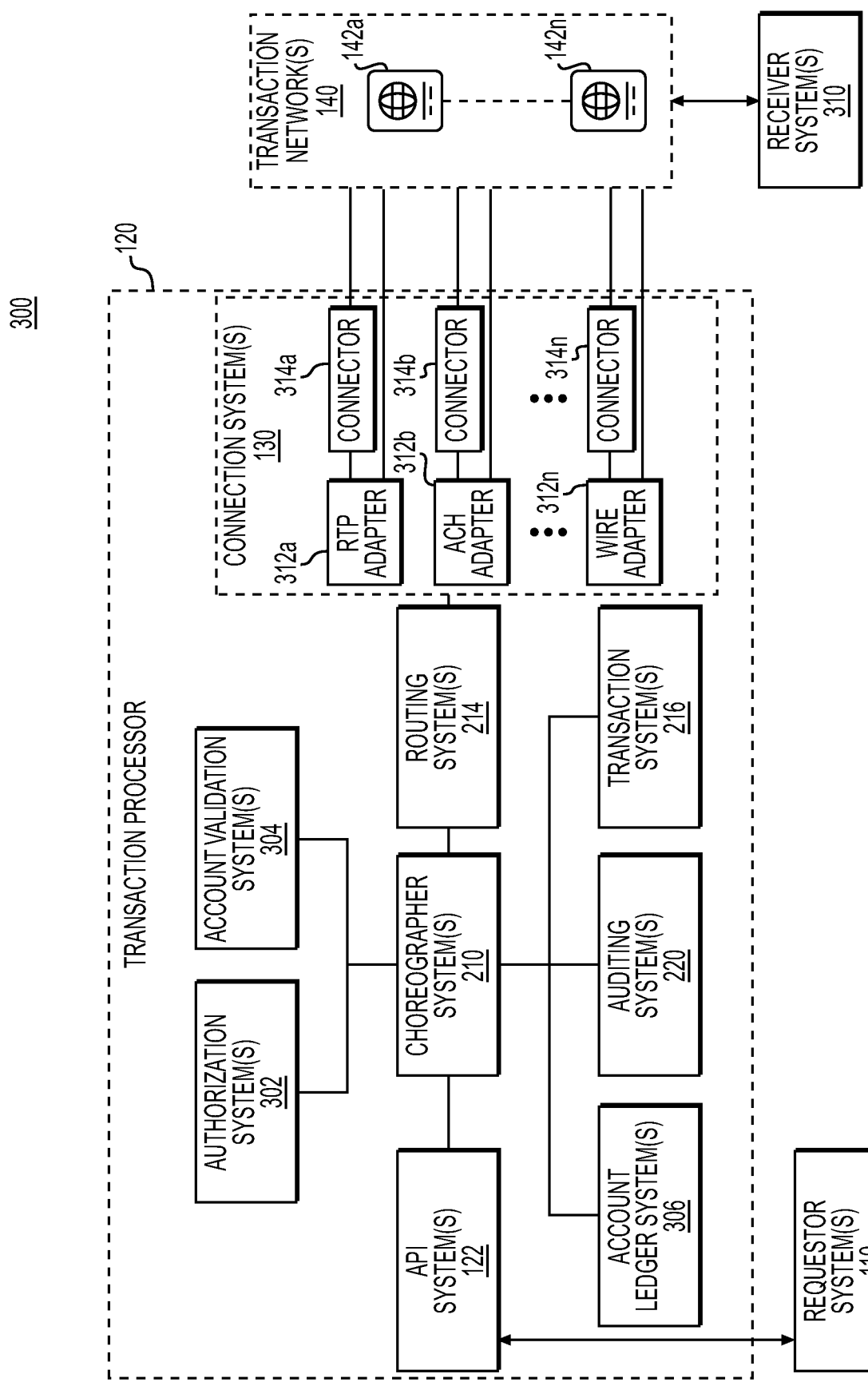
FIG. 3 depicts a block diagram of another exemplary electronic transaction system, according to one aspect of the present disclosure.

FIG. 3 depicts an exemplary system 300 for facilitating an electronic transaction request (e.g., a payment request) of the present disclosure. The system 300 may include, for example, the requestor system(s) 110, the transaction processor 120, the transaction network(s) 140, and the receiver system(s) 310. In this embodiment, the transaction processor 120 may include, further to the systems depicted in FIG. 3, one or more systems or microservices. For example, the transaction processor 120 may include an authorization system(s) 302, an account validation system(s) 304, an account ledger system(s) 306, and an auditing system(s) 220, which may be in in communication with the choreographer system(s) 210. In this embodiment, the connection system(s) 130 may include one or more scheme or network adapters. For example, the connections system(s) 130 may include an RTP adapter 312a, an ACH adapter 312b, a wire adapter 312n, etc. Further, the connection system(s) 130 may include connectors 314a-n that may be configured to facilitate communication with the transaction network(s) 140.

Still referring to FIG. 3, the authorization system(s) 302 may expose an internal API that may be called by other systems or microservices within the transaction processor 120 to verify that a user has access to perform operations and view data. The account validation system(s) 304 may exposes an internal API that may be called by other systems or microservices within the transaction processor 120 to perform inquiries against account details stored in a transaction processor database (not shown in the figure). The account ledger system(s) 306 may expose an internal API that may be called by other systems or microservices within the transaction processor 120 to perform inquiries against account ledger details stored in the database of the transaction processor 120. The account ledger system(s) 306 may subscribe to the transaction event topics of Kafka streams transmitted by the choreographer system(s) 210 in accordance with the present disclosure. Further, the account ledger system(s) 306 may watch for complete states and may use these events to update the ledger database. In one embodiment, the auditing system(s) 220 may subscribe to the transaction event topics of Kafka streams transmitted by the choreographer system(s) 210. The auditing system(s) 220 may transmit these events to a data lake for analytics.

Still referring to FIG. 3, the transaction system(s) 216 may expose an internal API that may be called by other systems or microservices within the transaction processor 120 to perform inquiries against account details stored in a Not Only Structured Query Language (NoSQL) database provided by the transaction processor 120. As described in reference to FIG. 2, the routing system(s) 214 may be responsible for choreographing the steps required to route and execute payment requests. The routing system(s) 214 may subscribe to the transaction event topics of Kafka streams transmitted by the choreographer system(s) 210 and may act on payment initiated events to initiate routing requests. The routing system(s) 214 may make an internal API call to the Entitlement Query Service to retrieve customer specific configuration details that may impact the route. The routing system(s) 214 may process the request, including the customer entitlement details, through the routing model to identify the appropriate payment scheme adapter.

Still referring to FIG. 3, the RTP adapter 312a may expose an internal API for processing payments across RTP schemes or rails. The RTP scheme adapter 312a may call into the internal/external market specific API RTP rail implementation. The ACH adapter may expose an internal API for processing payments across ACH rails. The ACH adapter 312b may call into the internal/external market specific API ACH rail implementation. The wire adapter 312n may expose an internal API for processing payments across wire rails. The wire adapter 312n may call into the internal/external market specific API wire rail implementation.

In one embodiment, incoming payment requests (e.g., a payment request API) from users (e.g., a payment sender) in the requestor system(s) 110 may be managed by the API system(s) 122. The API system(s) 122 may execute an authentication check of the user identify (e.g., via an Open Authorization 2.0 (OAuth2)) by communicating with an identity provider (IdP) of the transaction processor 120. The API system(s) 122 may then forward the payment request to the payment choreograph system(s) 210. The choreographer system(s) 210 may then initiate an authorization check with the authorization system(s) 302. Once authorization system(s) 302 verifies the requestor system(s) 110 has permission to perform the transaction, the choreographer system(s) 210 may communicate with the account validation system(s) 304 to check whether the user in requestor system(s) 110 exist in a database of the transaction processor 120. The choreographer system(s) 210 may then stream Kafka messages that may be received by the account ledger system(s) 306, auditing system(s) 220, transaction system(s) 216, and the routing system(s) 214.

Still referring to FIG. 3, the routing system(s) 214 may forward the payment request to the optimal scheme (or rail) adapter in the connection system(s) 130. The connection system(s) 130 may then transmit the payment request to the appropriate scheme (e.g., schemes 142a-142n) in the transaction network(s) 140. In one embodiment, a third-party service provider may directly implement one or more adapters provided by the connection system(s) 130. Thus, the transaction processor 120 may not be required to integrate to the third-party service provider API.

Figure 4:
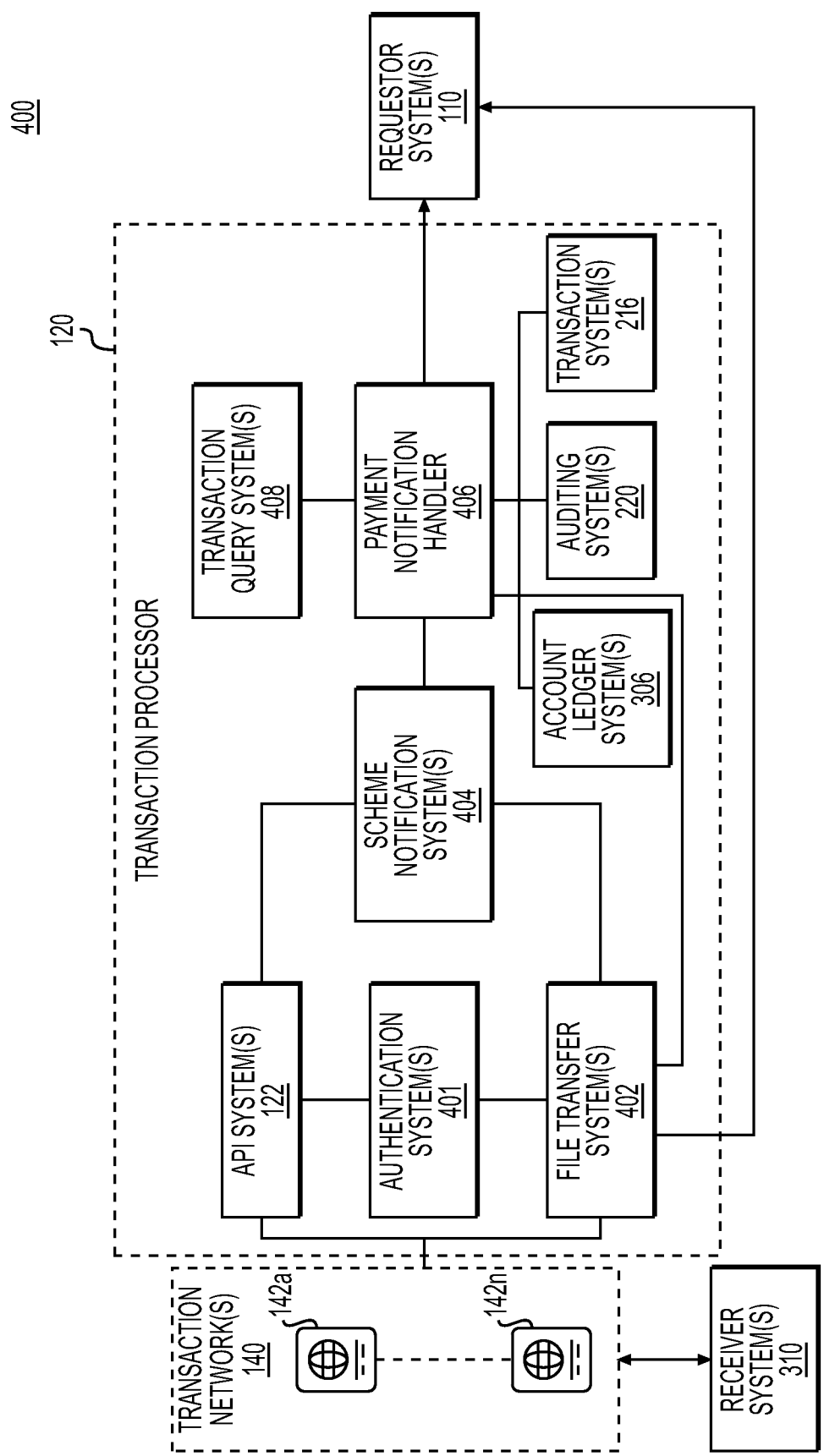
FIG. 4 depicts a block diagram of another exemplary electronic transaction system, according to one aspect of the present disclosure.

FIG. 4 depicts an exemplary system 400 for facilitating transaction reconciliation and notification of the present disclosure. The system 400 may include, for example, the requestor system(s) 110, the transaction processor 120, the transaction network(s) 140, and a receiver system(s) 310. In this embodiment, the transaction processor 120 may include, further to the systems depicted in FIGS. 3 and 4, an authentication system(s) 401, a file transfer system(s) 402, a scheme notification system(s) 404, a payment notification handler 406, and a transaction query system(s) 408. In one embodiment, the authentication system(s) 401 may authenticate APIs using an OAuth2 protocol against an identity provider (IdP) of the transaction processor 120. Further, the authentication system(s) 401 may authenticate username and password for accessing the portal system(s) 212. In one embodiment, the scheme notification system(s) 404 may translate scheme specific notifications into a generic non-scheme specific format. The file transfer system(s) 402 may aggregate the notifications received from the schemes 142a-142n into a file and send to the receiver system(s) 310 based on the configured preferences. The transaction query system(s) 408 may expose an internal API that may be called by other systems or microservices of the transaction processor 120 to perform inquiries against account details stored in the NoSQL database. Further, the transaction query system(s) 408 may subscribe to transaction event topics from the Kafka streams of the transaction processor 120 and may utilize these events to update the NoSQL database. In one embodiment, the payment notification handler 406 may subscribe to payment notification topics and await the payment notification received messages. That is, when an event is processed, the payment notification handler 406 may first make an internal API call to a transaction query system(s) 408 to retrieve additional details of the transaction associated with the payment notification. The payment notification handler 406 may then publish to a payment notification topic, a payment acknowledgement message.

In one embodiment, the schemes 142a-142n in the transaction network(s) 140 may provide transaction updates to the transaction processor 120 as a transaction is processed. The updates may be received by the API system(s) 122 or as batch files (Secure File Transfer Protocol (SFTP) push or pulls) handled by the file transfer system(s) 402. The updates may also be authenticated by the authentication system(s) 401 to validate the sender of the updates. Upon successful validation, the updates may then be routed to the scheme notification system(s) 404. The scheme notification system (s) 404 may translate the scheme specific notification into a generic non-scheme specific format. The generic message may be pushed onto the Kafka message que and may be received by the payment notification handler 406. The payment notification handler 406 may call the transaction query system(s) 408 to retrieve the transaction details from a database of the transaction processor 120. The payment notification handler 406 may then transmit a Kafka message to the account ledger system(s) 306, auditing system(s) 220, and the transaction system(s) 216, and/or the file transfer system(s) 402. The file transfer system(s) 402 may aggregate the notifications into a file. The notification file may then be sent to the receiver system(s) 310 based on the configured preferences (e.g., a Webhook to the configured HTTPs endpoint, an SFTP push to the configured SFTP endpoint, and/or an SFTP pull form the receiver system(s) 310 to an SFTP server of the transaction processor. Thus, the reconciliation and notification aspects of the present disclosure may provide a real-time status of the payment to the requestors system(s) 110, allowing the transaction requestors to always know where the payment stands.

Figure 5:
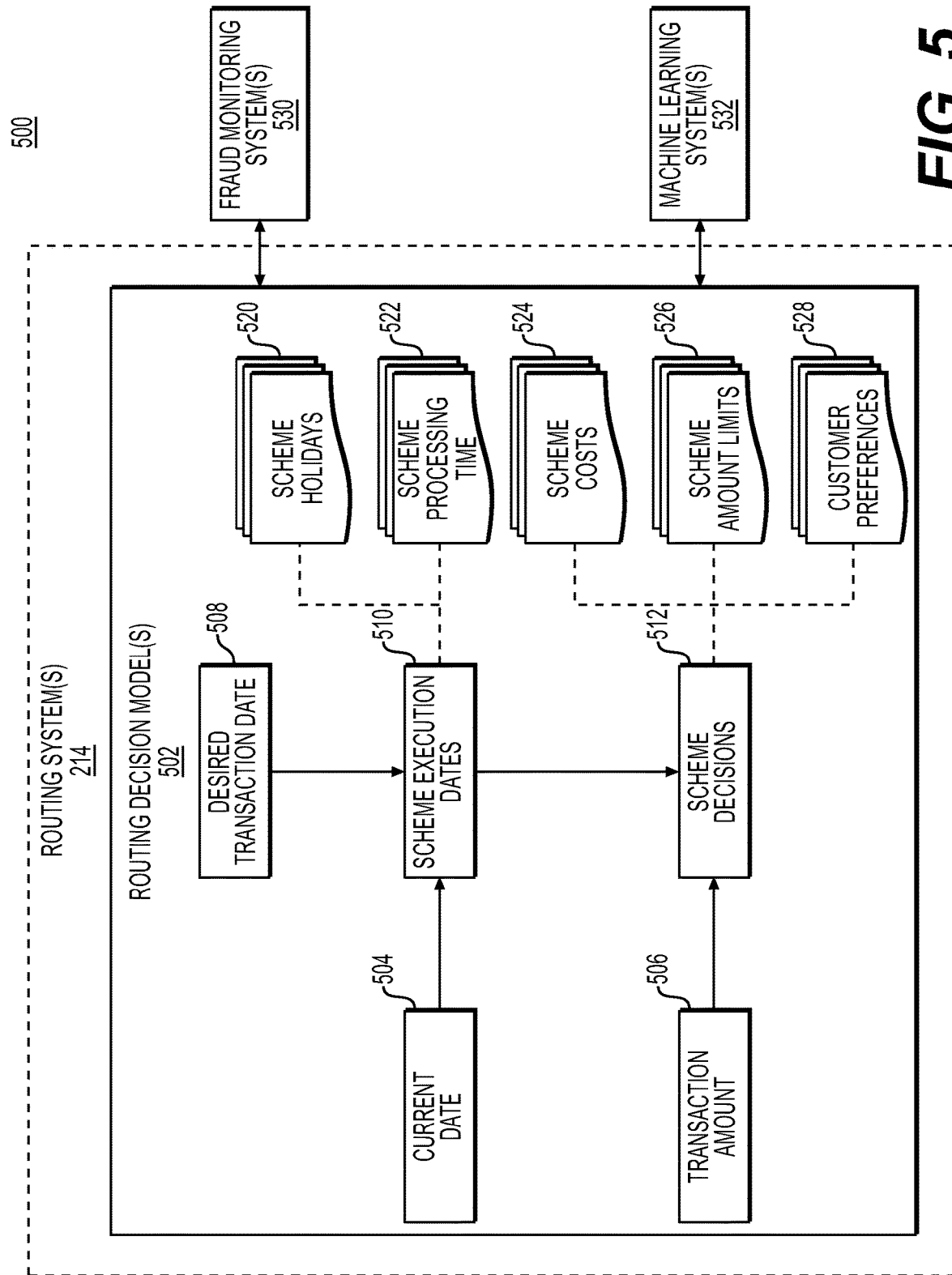
FIG. 5 depicts a block diagram of another exemplary electronic transaction system, according to one aspect of the present disclosure.

FIG. 5 depicts an exemplary system 500 for facilitating transaction routing of an electronic transaction, consistent with embodiments of the present disclosure. The system 500 may include the routing system(s) 214, a fraud monitoring system(s) 530, and a machine learning system(s) 532. In this embodiment, the routing system(s) 214 may include one or more routing decision model(s) 502. In one embodiment, the routing system(s) 214 may perform transaction routing by based on one or both of customer configurations and scheme capabilities. That is, the routing system(s) 214 may consider price, speed, and capability variables across both the customers and the schemes (e.g., schemes 142a-142n) and may identify the best possible route (e.g., fastest, cheapest, most rewarding, most preferred, etc.) for the transaction. The route for the transaction may be determined based on the configurations or preferences of a customer (e.g., speed versus cost processing preference). In one embodiment, the routing decision model(s) 502 may utilize at least the following data to determine an optimal path for executing the electronic transactions (e.g., payment request) of the present disclosure: current date 504, transaction amount 506, desired transaction date 508, scheme execution dates 510, scheme decisions 512, scheme holidays 520, scheme processing time 522, scheme costs 524, scheme amount limits 526, and customer preferences 528. The optimal path for executing, for example, a payment request, may be based on the user's (or client's) desired preferences. In one embodiment, the routing decision model(s) 502 may be executed based on, for example, two key inputs: transaction amount 506 and desired transaction date 508. That is, the routing decision model(s) 502 may factor in customer preferences and business knowledge to make decisions on the transaction schemes 142a-142n and scheme execution dates 510.

In one embodiment, one or more routing criteria may be considered by the routing decision model(s) 502 to determine the optimal transaction routes. For example, with respect to geography, the following questions, for example, may be considered: 1) Is this a U.S. domestic transaction? 2) Is this a U.K. domestic transaction? 3) Is this cross-border? and so on. Each option may affect or change the available routes and influence the decisioning processes of the routing decision model(s) 502. Regarding the scheme holidays 520 and the transaction processing time 522, unlike the RTP scheme, for example, other schemes or rails may take days to process a transaction. In order ensure that a transaction is processed on time, the processing time may be calculated and traced back to ensure any non-processing windows, such as a weekend or a bank holiday are not ignored. Regarding the scheme (or rail) costs 524, the costs may vary from rail to rail. As such, depending on the customer preference, the transactions may be routed through the cheapest route. Regarding the scheme amount limits 526, a transaction may exceed a particular rail's maximum allowed threshold. In such a case, the routing decision model(s) 502 may not consider that particular route option or potentially split a transaction across multiple payment rails.

In one embodiment, the rules built by the routing decision model(s) 502 may be configurable, for example, at different hierarchies: global system-wide rules; rules particular to a payment scheme; and customized client specific rules. Based on the different hierarchies of the rules of the routing decision model(s) 502, a user may be provided with various options for determining the routing of transaction requests.

In one embodiment, the customized client specific rules may be defined in multiple ways. For example, the routing system(s) 214 may determine the route of a transaction request based on a prescribed user preference. That is, the user may decide (e.g., user defined payment method) the route of the transaction request (e.g., a specific payment scheme, payment routes, payment timing, etc.). Additionally or alternatively, the routing system(s) 214 may provide, for example, via a user interface (e.g., a graphical user dashboard), available routing options to a user. For example, the routing system(s) 214 may provide, based on the routing decision model(s) 502, a list of different duration and cost options that a user may choose for completing the transaction requests. The routing system(s) 214 may then route the transaction request based on the user's selected option. Additionally or alternatively, the user may provide, for example, via the user interface, one or more user preferences (e.g., transaction amount, transaction due date, etc.) to the routing system(s) 214. The routing system(s) 214 may then utilize the routing decision model(s) 502 to determine and decide the optimum route for the user based on the preferences provided by the user.

In addition to the rules-based routing inputs, the routing system(s) 214 may receive real-time feedback from the fraud monitoring system(s) 530. That is, based on a fraud profiling conducted by the fraud monitoring system(s) 530, a transaction may be routed to a different rail. For example, a risky transaction may be moved from an RTP scheme to a credit scheme if the credit scheme may allow for chargebacks. Also, inputs from the machine learning system(s) 532 may provide out-of-band, non-real-time machine learning feedback to adjust payment routes as subtle trends are identified.

Figure 6:
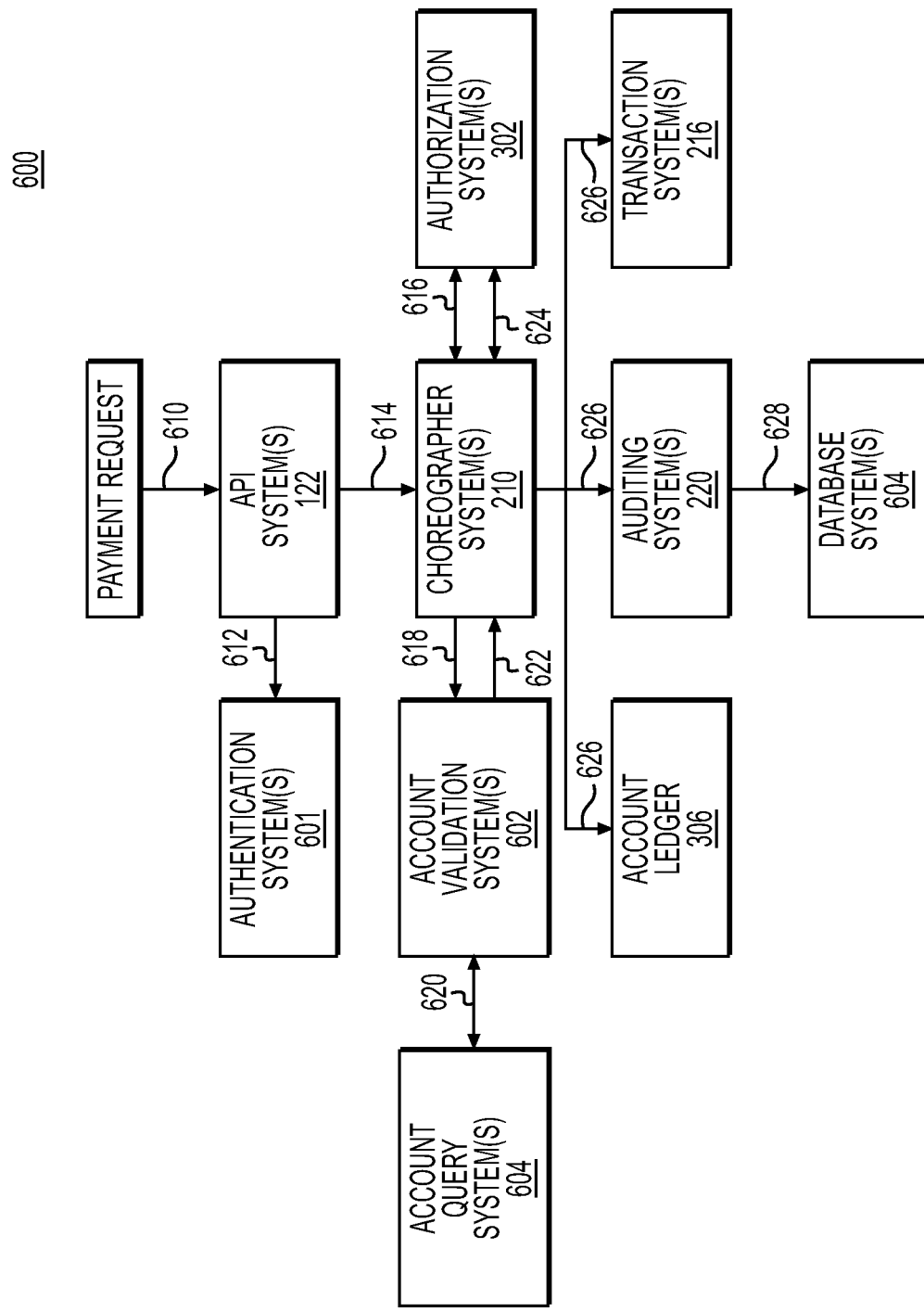
FIG. 6 illustrates a flowchart of an exemplary method of executing an electronic transaction, according to one aspect of the present disclosure.

FIG. 6 illustrates a flowchart of an exemplary method 600 of executing an electronic transaction of the present disclosure. Exemplary process flows of the method 600, performed in accordance with the systems 100, 200, and 300 above, are described hereinafter.

At step 610, the API system(s) 122 may receive a payment request from a user (e.g., requestor system(s) 110). At step 612, the API system(s) 122 may communicate with the authentication system(s) 302 to authenticate the user. The authentication system(s) 302 may communicate with an identity provider (IdP) of the transaction processor 120 to verify the authenticity of the identity of the user. At step 614, the API system(s) 122 may transmit the payment request to the choreographer system(s) 210. At step 616, the choreographer system(s) 210 may make an internal API call to an authorization system(s) 601 of the transaction processor. The authorization system(s) 601 may verify whether the user has permissions to perform a payment request. The authorization system(s) 601 may then transmit an authorization response to the choreographer system(s) 210. At step 618, the choreographer system(s) 210 may make an internal API call to an account validation system(s) 602 to verify whether the referenced bank accounts associated with the payment request exists in the transaction processor 120. At step 620, the account validation system(s) 602 may communicate with an account query system(s) 604 of the transaction processor 120 to confirm whether the bank accounts associated with the payment request exists outside of the transaction processor 120. At step 622, the account validation system(s) 602 may transmit a validation response message to the choreographer system(s) 210. At step 624, the choreographer system(s) 210 may make an internal API call to the authorization system(s) 601 to verify that the user has permission to transact against the sender account. The authorization system(s) 601 may then transmit an authorization response to the choreographer system(s) 210. At step 626, the choreographer system(s) 210 may publish, via an event-topic stream (e.g., Kafka stream) a payment request message to the account ledger system(s) 306, the auditing system(s) 220, and the transaction system(s) 216. The choreographer system(s) 210 may also respond back to the user that the payment request has been accepted for processing. Further, the payment request message may be sent to its subscribers for processing. For example, the routing system(s) 214 may receive the payment request event and may begin processing the payment. The transaction query system may receive the payment request event and update its NoSQL database. The account ledger system(s) 306 may receive the payment request event and may ignore it since they payment has not yet been completed. At step 628, the auditing system(s) 220 may transmit the payment request event to the database system(s) 604 for analytics.

Figure 7:
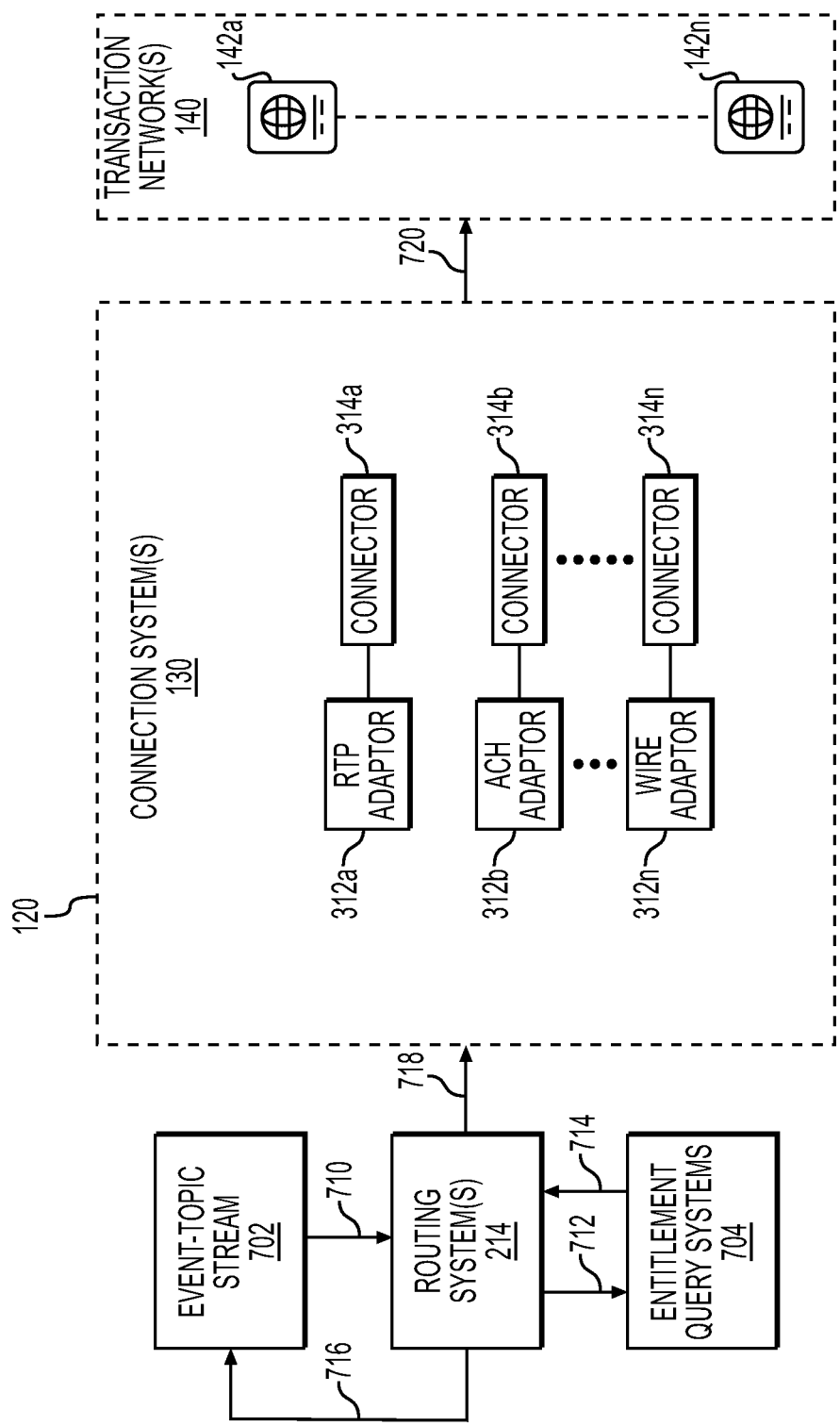
FIG. 7 illustrates a flowchart of another exemplary method of executing an electronic transaction, according to one aspect of the present disclosure.

FIG. 7 illustrates a flowchart of an exemplary method 700 of executing an electronic transaction routing of the present disclosure. Exemplary process flows of the method 700, performed in accordance with the systems 100, 200, 300, and 500 above, are described hereinafter.

At step 710, the routing system(s) 214 may receive the payment request event from the choreograph system(s) 601 via an event-topic stream 702 (e.g., Kafka stream). At step 712, the routing system(s) 214 may send a query request, for example via an API call, to an entitlement query system(s) 704 to retrieve customer configuration that may affect the routing path and/or timing of the payment request event. The entitlement query system(s) 704 may, for example, utilize Structured Query Language (SQL) to communicate with a database that may the customer configuration data. At step 714, the entitlement query service system(s) 704 may transmit the requested customer configuration data to the routing system(s) 214. The routing system(s) 214 may run the payment request and the customer configuration data through the routing decision model(s) 502 in order to determine an optimum route to send the payment request. At step 716, the routing system(s) 214 may publish the optimum route (e.g., a chosen route) information to the event-topic stream 702. Any subscribers to the event-topic stream 702 may then utilize the chosen route information for further processing. At step 718, the routing system(s) 704 may generate and transmit an informational message to the customer depending upon the customer configuration data. In one embodiment, the informational message may include information regarding the chosen route of the transaction (or payment) before the transaction is executed. Thus, the customer may inspect and confirm the chosen route of transaction before the transaction is executed. Additionally or alternatively, the routing systems(s) 214 may, either immediately or at a future time, schedule and transmit the payment request, for example via an API call, to an appropriate network/scheme adaptor (e.g., 312a-312n) in the connection system(s) 130 based on the optimum route. At step 720, the selected networked/scheme adaptor may then transmit, for example via an API call, a market specific payment scheme implementation in the transaction network(s) 140 in order to execute and complete the payment request.

FIG. 8 illustrates a flowchart of another exemplary method 800 of requesting an electronic transaction in accordance with the present disclosure. Exemplary process flows of the method 800, performed in accordance with the systems 100, 200, 300, 500, and 700 above, are described hereinafter.

At step 802, a routing system (e.g., the routing system(s) 214) may receive an electronic transaction request (e.g., a payment request) from a user. At step 804, the routing system may receive routing configuration data from a data query system (e.g., entitlement query system(s) 704). The routing configuration data may include a user preference, and the user preference may include at least a transaction amount or a desired transaction completion date. In one embodiment, the routing system may receive the electronic request from the user via the transaction event-topic stream.

At step 806, the routing system may determine an optimal path for executing the electronic transaction in accordance with a routing decision model and the routing configuration data. The routing decision model may include routing criteria. Further, the routing criteria include at least geography information, transaction processing time, bank holidays, transaction network scheme costs, transaction scheme amount limits, or currency exchange rates for transaction routes. In one embodiment, the routing system may configure the routing decision model based at least on system-wide rules, payment scheme rules, or customized user specific rules. Additionally, the routing system may transmit transaction data to a machine learning system (e.g., machine learning system(s) 532) and receive an adjusted routing rule from the machine learning system. Additionally, the routing system may receive a real-time feedback from a fraud profiling system (e.g., fraud monitoring system(s) 530). Additionally, the routing system(s) 214 may receive information on currency conversion rates for different routes to consider in the routing decision.

At step 808, the routing system may transmit the electronic transaction request to a transaction network via the optimal path. At step 810, the routing system may generate a transaction route data based on the optimal path. In one embodiment, the routing system may transmit an Application Programming Interface (API) call to the data query system to request the routing configuration data. At step 812, the routing system may transmit the transaction route data to a transaction event-topic stream.

In addition to a standard desktop, or server, it is fully within the scope of this disclosure that any computer system capable of the required storage and processing demands would be suitable for practicing the embodiments of the present disclosure. This may include tablet devices, smart phones, pin pad devices, and any other computer devices, whether mobile or even distributed on a network (i.e., cloud based).

Unless specifically stated otherwise, as apparent from the following discussions, it is appreciated that throughout the specification discussions utilizing terms such as "processing," "computing," "calculating," "determining", "analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer," a "computing machine," a "computing platform," a "computing device," or a "server" may include one or more processors.

Figure 9:
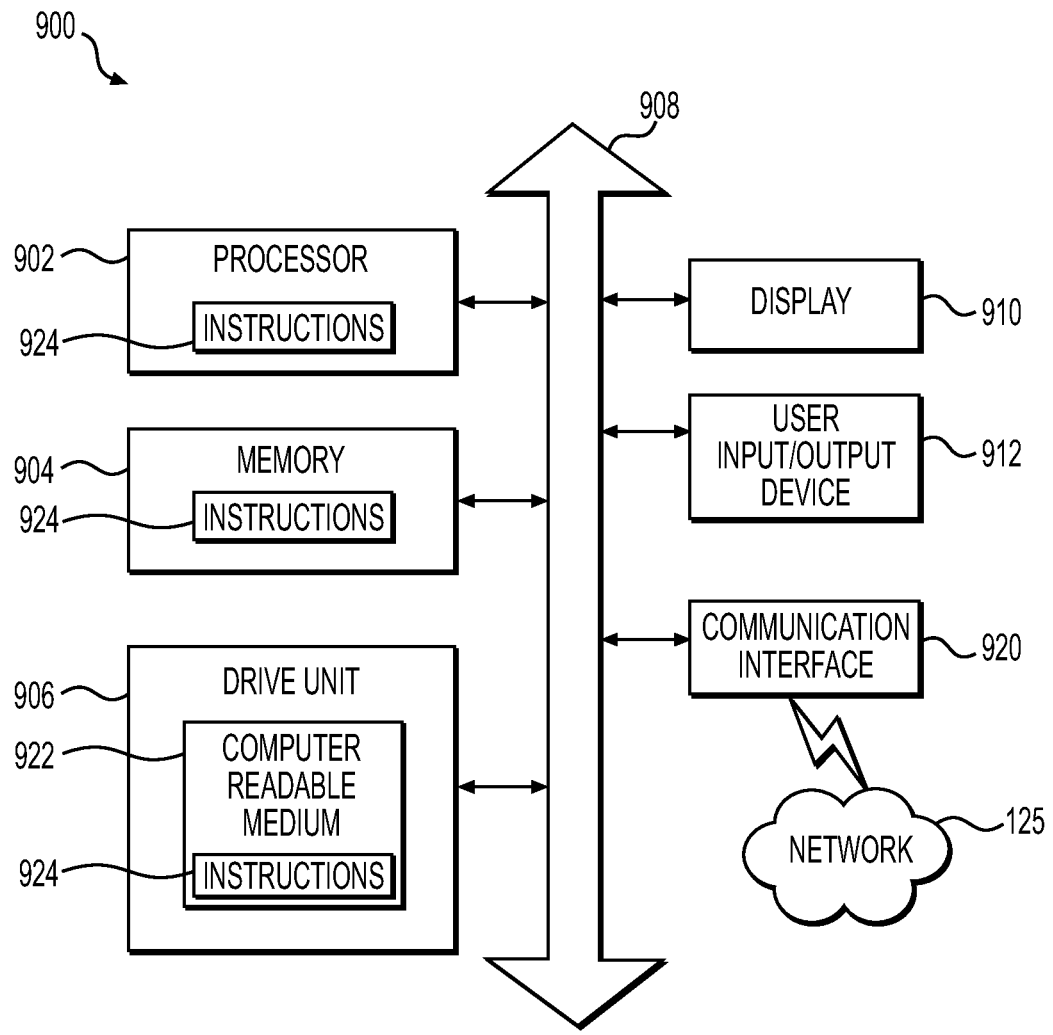
FIG. 9 illustrates a computer system for executing the techniques described herein.

FIG. 9 illustrates a computer system designated 900. The computer system 900 can include a set of instructions that can be executed to cause the computer system 900 to perform any one or more of the methods or computer based functions disclosed herein. The computer system 900 may operate as a standalone device or may be connected, e.g., using a network, to other computer systems or peripheral devices.

In a networked deployment, the computer system 900 may operate in the capacity of a server or as a client user computer in a server-client user network environment, or as a peer computer system in a peer-to-peer (or distributed) network environment. The computer system 900 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 900 can be implemented using electronic devices that provide voice, video, or data communication. Further, while a single computer system 900 is illustrated, the term "system" shall also be taken to include any collection of systems or sub-systems that individually or jointly execute a set, or multiple sets, of instructions to perform one or more computer functions.

As illustrated in FIG. 9, the computer system 900 may include a processor 902, e.g., a central processing unit (CPU), a graphics processing unit (GPU), or both. The processor 902 may be a component in a variety of systems. For example, the processor 902 may be part of a standard personal computer or a workstation. The processor 902 may be one or more general processors, digital signal processors, application specific integrated circuits, field programmable gate arrays, servers, networks, digital circuits, analog circuits, combinations thereof, or other now known or later developed devices for analyzing and processing data. The processor 902 may implement a software program, such as code generated manually (i.e., programmed).

The computer system 900 may include a memory 904 that can communicate via a bus 908. The memory 904 may be a main memory, a static memory, or a dynamic memory. The memory 904 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 904 includes a cache or random-access memory for the processor 902. In alternative implementations, the memory 904 is separate from the processor 902, such as a cache memory of a processor, the system memory, or other memory. The memory 904 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 904 is operable to store instructions executable by the processor 902. The functions, acts or tasks illustrated in the figures or described herein may be performed by the programmed processor 902 executing the instructions stored in the memory 904. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel payment and the like.

As shown, the computer system 900 may further include a display unit 910, such as a liquid crystal display (LCD), an organic light emitting diode (OLED), a flat panel display, a solid-state display, a cathode ray tube (CRT), a projector, a printer or other now known or later developed display device for outputting determined information. The display 910 may act as an interface for the user to see the functioning of the processor 902, or specifically as an interface with the software stored in the memory 904 or in the drive unit 906.

Additionally or alternatively, the computer system 900 may include an input device 912 configured to allow a user to interact with any of the components of system 900. The input device 912 may be a number pad, a keyboard, or a cursor control device, such as a mouse, or a joystick, touch screen display, remote control, or any other device operative to interact with the computer system 900.

The computer system 900 may also or alternatively include a disk or optical drive unit 906. The disk drive unit 906 may include a computer-readable medium 922 in which one or more sets of instructions 924, e.g., software, can be embedded. Further, the instructions 924 may embody one or more of the methods or logic as described herein. The instructions 924 may reside completely or partially within the memory 904 and/or within the processor 902 during execution by the computer system 900. The memory 904 and the processor 902 also may include computer-readable media as discussed above.

In some systems, a computer-readable medium 922 includes instructions 924 or receives and executes instructions 924 responsive to a propagated signal so that a device connected to a network 970 can communicate voice, video, audio, images, or any other data over the network 970. Further, the instructions 924 may be transmitted or received over the network 970 via a communication port or interface 920, and/or using a bus 908. The communication port or interface 920 may be a part of the processor 902 or may be a separate component. The communication port 920 may be created in software or may be a physical connection in hardware. The communication port 920 may be configured to connect with a network 970, external media, the display 910, or any other components in system 900, or combinations thereof. The connection with the network 970 may be a physical connection, such as a wired Ethernet connection or may be established wirelessly as discussed below. Likewise, the additional connections with other components of the system 900 may be physical connections or may be established wirelessly. The network 970 may alternatively be directly connected to the bus 908.

While the computer-readable medium 922 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 922 may be non-transitory, and may be tangible.

The computer-readable medium 922 can include a solid-state memory such as a memory card or other package that houses one or more non-volatile read-only memories. The computer-readable medium 922 can be a random-access memory or other volatile re-writable memory. Additionally or alternatively, the computer-readable medium 922 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 900 may be connected to one or more networks 970. The network 970 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 870 may include wide area networks (WAN), such as the Internet, local area networks (LAN), campus area networks, metropolitan area networks, a direct connection such as through a Universal Serial Bus (USB) port, or any other networks that may allow for data communication. The network 870 may be configured to couple one computing device to another computing device to enable communication of data between the devices. The network 870 may generally be enabled to employ any form of machine-readable media for communicating information from one device to another. The network 870 may include communication methods by which information may travel between computing devices. The network 870 may be divided into sub-networks. The sub-networks may allow access to all of the other components connected thereto or the sub-networks may restrict access between the components. The network 870 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel payment. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP, etc.) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosed embodiments are not limited to any particular implementation or programming technique and that the disclosed embodiments may be implemented using any appropriate techniques for implementing the functionality described herein. The disclosed embodiments are not limited to any particular programming language or operating system.

It should be appreciated that in the above description of exemplary embodiments, various features of the embodiments are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that a claimed embodiment requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment.

Furthermore, while some embodiments described herein include some but not other features included in other embodiments, combinations of features of different embodiments are meant to be within the scope of the present disclosure, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the function.

In the description provided herein, numerous specific details are set forth. However, it is understood that embodiments of the present disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the present disclosure, those skilled in the art will recognize that other and further modifications may be made thereto without departing from the spirit of the present disclosure, and it is intended to claim all such changes and modifications as falling within the scope of the present disclosure. For example, any formulas given above are merely representative of procedures that may be used. Functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method of executing an electronic transaction routing by a real-time transaction system, wherein the real-time transaction system includes a routing system, a choreographer system, an entitlement query system, and a fraud monitoring system, the method comprising:
   receiving, by the routing system, a payment request from the choreographer system;
   transmitting, by the routing system, a query request to the entitlement query system and retrieving customer configuration data from the entitlement query system;
   receiving, at the routing system, the customer configuration data from the entitlement query system in response to the query request;
   determining, using the routing system, a plurality of paths for executing the payment request, wherein each of the plurality of paths comprise a different route through one or more servers associated with a transaction network;
   selecting, using the routing system, an optimum path from the plurality of paths in accordance with a routing decision model, wherein the routing decision model is a rule-based engine based on processing time, processing cost, processing capabilities, and routing criteria;
   receiving, by the routing system, a fraud profile of the electronic transaction from the fraud monitoring system;
   determining, by the routing system, a value of the payment request exceeds a predefined threshold for one or more of the plurality of paths, wherein the value of the payment request is split across the plurality of paths based on the predefined threshold;

adjusting, by the routing system, the optimum path based on the fraud profile of the electronic transaction and the split value of the payment request;

publishing, using the routing system, the adjusted optimum path to an event-topic stream;

transmitting, using the routing system via the event-topic stream, a generated informational message based on the adjusted optimum path to a customer based on the customer configuration data;

receiving, using the routing system, a confirmation of the adjusted optimum path based on the generated informational message; and executing, using the routing system, the payment request via the adjusted optimum path.

2. The computer-implemented method of claim 1, wherein the customer configuration data affects a routing path and/or a timing of the payment request.

3. The computer-implemented method of claim 1, wherein the entitlement query system utilizes a Structured Query Language (SQL) to communicate with a database that contains the customer configuration data.

4. The computer-implemented method of claim 1, wherein selecting the optimum path further comprises processing the payment request and the customer configuration data through the routing decision model.

5. The computer-implemented method of claim 1, wherein the generated informational message comprises information associated with the optimum path prior to execution of the payment request.

6. The computer-implemented method of claim 1, wherein the executing comprises:

scheduling, via an application programming interface (API) call, processing of the payment request across the transaction network;

transmitting, subsequent to the scheduling, the payment request to a network/scheme adaptor based on the optimum path; and further transmitting, via the network/scheme adaptor, a market specific payment scheme implementation in the transaction network to execute the payment request.

7. The computer-implemented method of claim 6, wherein the scheduling the processing of the payment request comprises scheduling at an immediate time or at a future time.

8. A real-time transaction system for executing an electronic transaction routing, comprising:

one or more computer readable media storing instructions for executing a real-time electronic transaction;

a routing system, a choreographer system, an entitlement query system, and a fraud monitoring system; and one or more processors configured to execute the instructions to perform operations comprising:

receiving, by the routing system, a payment request from the choreographer system;

transmitting, by the routing system, a query request to the entitlement query system and retrieving customer configuration data from the entitlement query system;

receiving, at the routing system, the customer configuration data from the entitlement query system in response to the query request;

determining, using the routing system, a plurality of paths for executing the payment request, wherein each of the plurality of paths comprise a different route through one or more servers associated with a transaction network;

selecting, using the routing system, an optimum path from the plurality of paths in accordance with a routing decision model, wherein the routing decision model is a rule-based engine based on processing time, processing cost, processing capabilities, and routing criteria;

receiving, by the routing system, a fraud profile of the electronic transaction from the fraud monitoring system;

determining, by the routing system, a value of the payment request exceeds a predefined threshold for one or more of the plurality of paths, wherein the value of the payment request is split across the plurality of paths based on the predefined threshold;

adjusting, by the routing system, the optimum path based on the fraud profile of the electronic transaction and the split value of the payment request;

publishing, using the routing system, the adjusted optimum path to an event-topic stream;

transmitting, using the routing system via the event-topic stream, a generated informational message based on the adjusted optimum path to a customer based on the customer configuration data;

receiving, using the routing system, a confirmation of the adjusted optimum path based on the generated informational message; and executing, using the routing system, the payment request via the adjusted optimum path.

9. The real-time transaction system of claim 8, wherein the customer configuration data affects a routing path and/or a timing of the payment request.

10. The real-time transaction system of claim 8, wherein the entitlement query system utilizes a Structured Query Language (SQL) to communicate with a database that contains the customer configuration data.

11. The real-time transaction system of claim 8, wherein selecting the optimum path comprises processing the payment request and the customer configuration data through the routing decision model.

12. The real-time transaction system of claim 8, wherein the generated informational message comprises information associated with the optimum path prior to execution of the payment request.

13. The real-time transaction system of claim 12, wherein the executing comprises:

scheduling, via an application programming interface (API) call, processing of the payment request across the transaction network;

transmitting, subsequent to the scheduling, the payment request to a network/scheme adaptor based on the optimum path; and further transmitting, via the network/scheme adaptor, a market specific payment scheme implementation in the transaction network to execute the payment request.

14. The real-time transaction system of claim 13, wherein the scheduling the processing of the payment request comprises scheduling at an immediate time or at a future time.

15. A non-transitory computer-readable medium storing instructions for executing electronic transaction routing by a real-time transaction system, wherein the real-time transaction system includes a routing system, a choreographer system, an entitlement query system, and a fraud monitoring system, the instructions, when executed by one or more processors, causing the one or more processors to perform operations, comprising:

receiving, by the routing system, a payment request from the choreographer system;

transmitting, by the routing system, a query request to the entitlement query system and retrieving customer configuration data from the entitlement query system;

receiving, at the routing system, the customer configuration data from the entitlement query system in response to the query request;

determining, using the routing system, a plurality of paths for executing the payment request, wherein each of the plurality of paths comprise a different route through one or more servers associated with a transaction network;

selecting, using the routing system, an optimum path from the plurality of paths in accordance with a routing decision model, wherein the routing decision model is a rule-based engine based on processing time, processing cost, processing capabilities, and routing criteria;

receiving, by the routing system, a fraud profile of the electronic transaction from the fraud monitoring system;

determining, by the routing system, a value of the payment request exceeds a predefined threshold for one or more of the plurality of paths, wherein the value of the payment request is split across the plurality of paths based on the predefined threshold;

adjusting, by the routing system, the optimum path based on the fraud profile of the electronic transaction and the split value of the payment request;

publishing, using the routing system, the adjusted optimum path to an event-topic stream;

transmitting, using the routing system via the event-topic stream, a generated informational message based on the adjusted optimum path to a customer based on the customer configuration data;

receiving, using the routing system, a confirmation of the adjusted optimum path based on the generated informational message; and executing, using the routing system, the payment request via the adjusted optimum path.

16. The non-transitory computer-readable medium of claim 15, wherein the customer configuration data affects a routing path and/or a timing of the payment request.

17. The non-transitory computer-readable medium of claim 15, wherein the entitlement query system utilizes a Structured Query Language (SQL) to communicate with a database that contains the customer configuration data.

18. The non-transitory computer-readable medium of claim 15, wherein selecting the optimum path comprises processing the payment request and the customer configuration data through the routing decision model.

19. The non-transitory computer-readable medium of claim 15, wherein the generated informational message comprises information associated with the optimum path prior to execution of the payment request.

20. The non-transitory computer-readable medium of claim 15, wherein the executing comprises:

scheduling, via an application programming interface (API) call, processing of the payment request across the transaction network;

transmitting, subsequent to the scheduling, the payment request to a network/scheme adaptor based on the optimum path; and further transmitting, via the network/scheme adaptor, a market specific payment scheme implementation in the transaction network to execute the payment request.

* * * * *